US011463361B2

(12) United States Patent
Raj et al.

(10) Patent No.: US 11,463,361 B2
(45) Date of Patent: Oct. 4, 2022

(54) RATE ADAPTIVE TRANSACTIONS

(71) Applicant: HEWLETT PACKARD ENTERPRISE DEVELOPMENT LP, Houston, TX (US)

(72) Inventors: Anil Raj, Bangalore (IN); Madhusoodhana Chari Sesha, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 40 days.

(21) Appl. No.: 16/537,915

(22) Filed: Aug. 12, 2019

(65) Prior Publication Data
US 2020/0106707 A1    Apr. 2, 2020

(30) Foreign Application Priority Data
Sep. 27, 2018    (IN) .............................. 201841036594

(51) Int. Cl.
*H04L 47/11* (2022.01)
*H04L 49/00* (2022.01)
*H04L 47/283* (2022.01)
*H04L 47/70* (2022.01)

(52) U.S. Cl.
CPC ............ *H04L 47/11* (2013.01); *H04L 47/283* (2013.01); *H04L 47/822* (2013.01); *H04L 49/70* (2013.01)

(58) Field of Classification Search
CPC ....... H04L 41/142; H04L 45/02; H04L 47/11; H04L 47/283; H04L 47/822; H04L 49/70; H04L 67/325
See application file for complete search history.

(56) References Cited

U.S. PATENT DOCUMENTS

| 7,921,410 | B1 | 4/2011 | Symons et al. |
| 8,010,337 | B2 | 8/2011 | Narayanan et al. |
| 9,100,274 | B1 | 8/2015 | Ghosh |

(Continued)

OTHER PUBLICATIONS

Guru99, "How To Measure Response Time?" 2018, https://www.guru99.com/response-time-testing.html.

(Continued)

*Primary Examiner* — Ayaz R Sheikh
*Assistant Examiner* — Debebe A Asefa
(74) *Attorney, Agent, or Firm* — Hewlett Packard Enterprise Patent Department

(57) ABSTRACT

Examples disclosed herein relate to a system comprising a request transmitter to transmit a plurality of transaction requests from a first daemon to a central database, wherein the first daemon belongs to a plurality of daemons using the central database to communicate with each other to perform networking related functions. The system may include a baseline determiner to determine a baseline response time for receiving a response to the plurality of transaction requests, a transaction request transmitter to transmit a transaction request, belonging to the plurality of daemons, to the central database and a transaction requester determiner to determine that the central database is processing more requests that it can handle. The system may include a delay time generator to generate a delay time for a subsequent transaction request to the central database and a subsequent request transmitter to transmit the subsequent transaction request to central database.

20 Claims, 5 Drawing Sheets

(56) References Cited

U.S. PATENT DOCUMENTS

| | | | |
|---|---|---|---|
| 9,369,386 B2 | | 6/2016 | McMurry et al. |
| 2014/0195666 A1* | | 7/2014 | Dumitriu ................ H04L 49/70 |
| | | | 709/223 |
| 2015/0100560 A1* | | 4/2015 | Davie .................... H04L 63/00 |
| | | | 707/703 |
| 2016/0044038 A1 | | 2/2016 | Kementsietsidis et al. |
| 2017/0195898 A1 | | 7/2017 | Logan et al. |
| 2019/0258756 A1* | | 8/2019 | Minwalla .............. H04L 41/145 |
| 2019/0294308 A1* | | 9/2019 | Kulkarni ............. G06F 11/3419 |
| 2019/0370243 A1* | | 12/2019 | Skrenta ............... G06F 16/2282 |

OTHER PUBLICATIONS

Nunes, A. et al., "AJITTS: Adaptive Just-In-Time Transaction Scheduling," Sep. 17, 2018, 14 pages, http://haslab.uminho.pt/aln/files/ajitts_camera_ready.pdf.

Read the Docs, Inc., "Open vSwitch Release 2.9.90," Jun. 20, 2018, 385 pages, https://media.readthedocs.org/pdf/ovs-istokes/mempool_rfc_v3/ovs-istokes.pdf.

* cited by examiner

RATE ADAPTIVE TRANSACTIONS

BACKGROUND

A network switch may be used to manage and/or route traffic within a network. A network switch may access one or more databases to store/retrieve information used in managing and routing traffic within the network.

BRIEF DESCRIPTION OF THE DRAWINGS

Some implementations of the present disclosure are described with respect to the following figures.

Figure 1A:
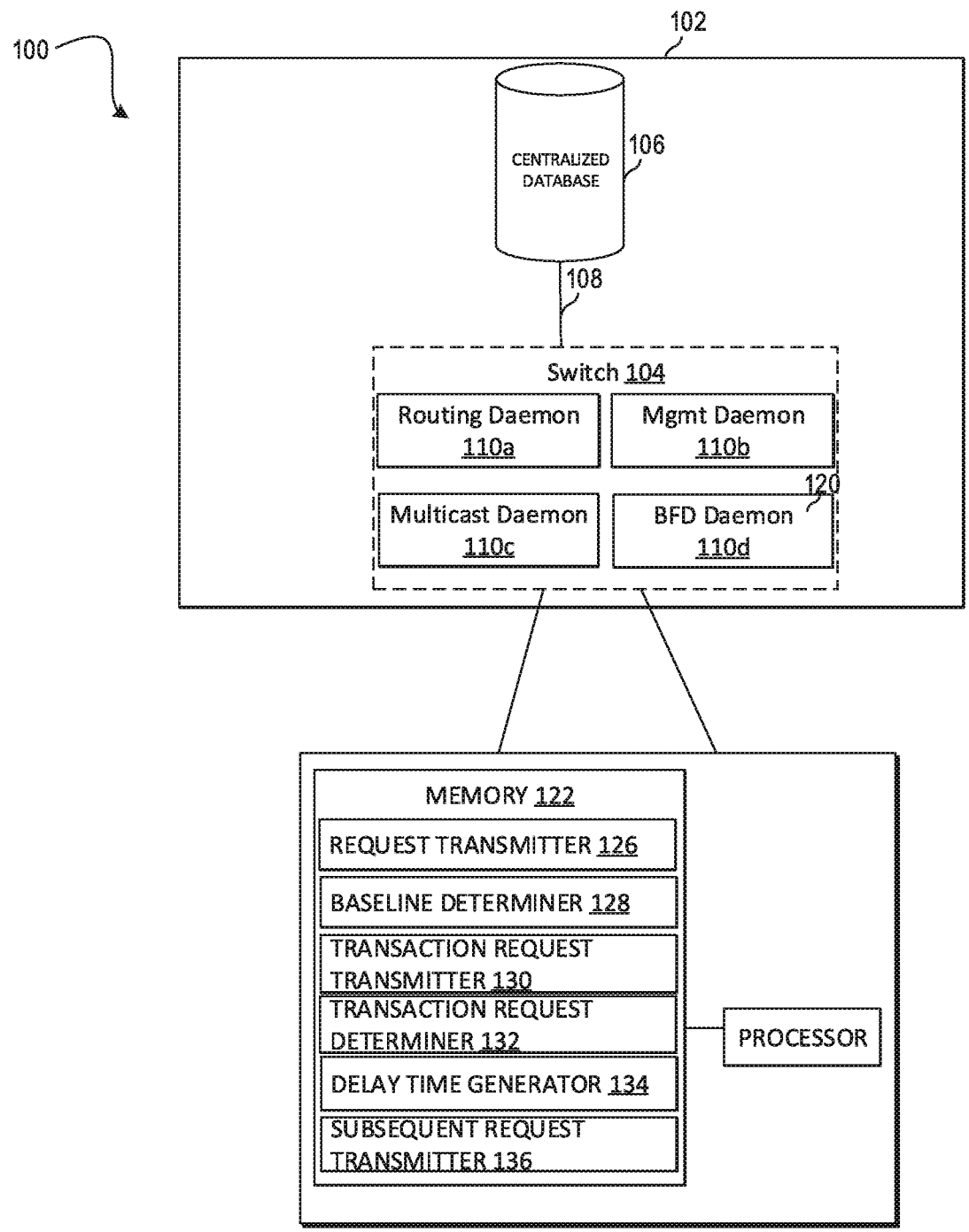
FIG. 1A is a block diagram of an example system for supporting rate adaptive transactions.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A network switch, such as a core switch, aggregation switch, edge switch, etc. may use a centralized database, such as a centralized state based switching database to facilitate interaction between numerous application daemons to perform network related functions. Example application daemons may include, routing daemons, forwarding table daemons, etc. Some or all of these daemons may write large amounts of data into the central database, such as an Open vSwitch Database (OVSDB) in the course of normal operation. If the number of transactions is more than centralized DB can handle at any point of time, the centralized DB may notify the application daemons with errors corresponding to the transaction request. Moreover, the transaction request may have to be retried by the application daemons. Such retries will further increase the number of requests the centralized DB has to handle which may in turn lead to more failures.

Aspects of the disclosure described herein may adapt the number of transactions pipelined to centralized DB based on the response time for the acknowledgement of transactions. In other words, the transaction complete time may be used as a way to understand the centralized DB's response time as a congestion aware mechanism. If the response for a particular transaction is delayed, it may be inferred that the centralized DB has exceeded its available bandwidth for processing transaction requests from application daemons. Based on the extent of delay in receiving the transaction response from centralized DB, the transmission of future transaction requests may be delay by the application daemons so as not to overwhelm the centralized DB.

FIG. 1A is a block diagram of an example system 100 where rate adaptive transactions may be useful in managing network 102. System 100 may implement a database driven network switch architecture. The system 100 may include at least one switch 104 connected to a database 106 via a link 108. Link 108 may be a physical link, such as an Ethernet connection or other physical connection, a wireless connection, a virtual connection, etc. In some aspects, the database may be part of or otherwise implemented in the switch 104.

In at least one embodiment, the subject matter claimed below includes a system. The system may comprise a request transmitter to transmit a plurality of transaction requests from a first daemon to a central database, wherein the first daemon belongs to a plurality of daemons using the central database to communicate with each other to perform networking related functions. The system may comprise a baseline determiner to determine a baseline response time for receiving a response, from a central database, to the plurality of transaction requests, wherein the baseline response time indicates that the central database has available bandwidth for processing transaction requests from the plurality of daemons. The system may comprise a transaction request transmitter to transmit a transaction request from a first daemon, belonging to the plurality of daemons, to the central database and a transaction requester determiner to determine, based on a response time to the transaction request being greater than the baseline response time, that the central database is processing more requests that it can handle. The system may comprise a delay time generator to generate, by the first daemon, a delay time for a subsequent transaction request to the central database, wherein the delay time allows the central database handle a plurality of pending transaction requests from the plurality of daemons and a subsequent request transmitter to transmit the subsequent transaction request to central database after applying the delay time.

A network switch, such as switch 104, may have routing capabilities such that the switch is responsible for routing data along a route (or equivalently, path) in network 102. The switch may perform routing of data based on routing information accessible by the router. For example, the routing information can be stored on a storage medium of the router, or on a storage medium separate from but accessible by the router.

A database, such as a time series database 106, may store some or all of the configuration, status, states and statistics of the network 102, the switch 104 and/or other devices on the network 102 at any given point at time. The different state data may be accessed from the database 106 either individually (data for a given time, a given device, etc.) or in aggregate (data aggregated for particular items over a given time period, etc.).

In some implementations, the switch 104 and database 106 form a centralized database architecture and operate according to a centralized database architecture protocol. One example of such a centralized database architecture protocol is an open vswitch database (OVSDB) architecture or protocol. In some implementations, the disclosed switches operate in accordance with an equal-cost multi-path (ECMP) routing protocol or strategy. Specifically, system 100 may implement a database-centric parallel processing model in which each daemon (i.e. application/process uses) the shared database for communicating between each other.

Each daemon subscribes to the database for the interested data and will be notified when the data being subscribed is produced/updated by another process. The database-centric approach leverages the indexing, transaction processing, integrity, recovery, and security capabilities provided by high-end database systems. Eliminating the concept of a master processor also removes a potential performance bottleneck and point of failure, resulting in applications that can be extended more easily and can adapt dynamically to changing workloads. This architecture makes it straightforward to design, implement, and manage distributed applications that are scalable, fault tolerant, and highly reliable. As shown in FIG. 1, database 106 may have store data corresponding to a plurality of daemons 110. These daemons may include routing daemon 110a, management daemon 110b, multicast daemon 110c and BFD daemon 110d. Of course, these are just example daemons and the database 106 may be used/accessed by numerous different daemons, processes, applications, etc.

Each daemon may produce data associate with that daemon as well as consume data associated with other daemons in the plurality 110. For example, the routing daemon 110a may produce data that is stored in the database 106 as well as consume data produced by the BFD daemon 110d. Similarly, the management daemon 110b may produce data that is stored in the database 106 and consume data produced by the routing daemon 110a. Of course, these are just example production/consumption patterns and daemons may produce and consume data in different configurations than those described above.

Some daemons, however, such as a routing daemon, produce a tremendous amount of data into the database 106, for each transaction. For example, the routing daemon may produce a large amount of data for each route update. In such cases, the database 106 will also need to handle multiple parallel requests from other daemons as well. The overall performance of the system 100 depends on the rate at which the database 106 can handle and service these requests. For every transaction request, the database 106 will send a response with the status of the transaction. When a network event happens, such as a routing adjacency, thousands of add/delete requests will be send to update the corresponding table in the database 106. If the database 106 is overwhelmed with update transaction requests, the chances of transaction failures are high. This may cause transaction retries and further congestion, and the performance of the system may be affected. For example, in the routing daemon example above, the overall convergence time of the Routing Protocols may be affected. Accordingly, system 100 may rate limit the number of concurrent transaction requests to the database so as to reduce the number of retries and improving the overall system performance.

Figure 1B:
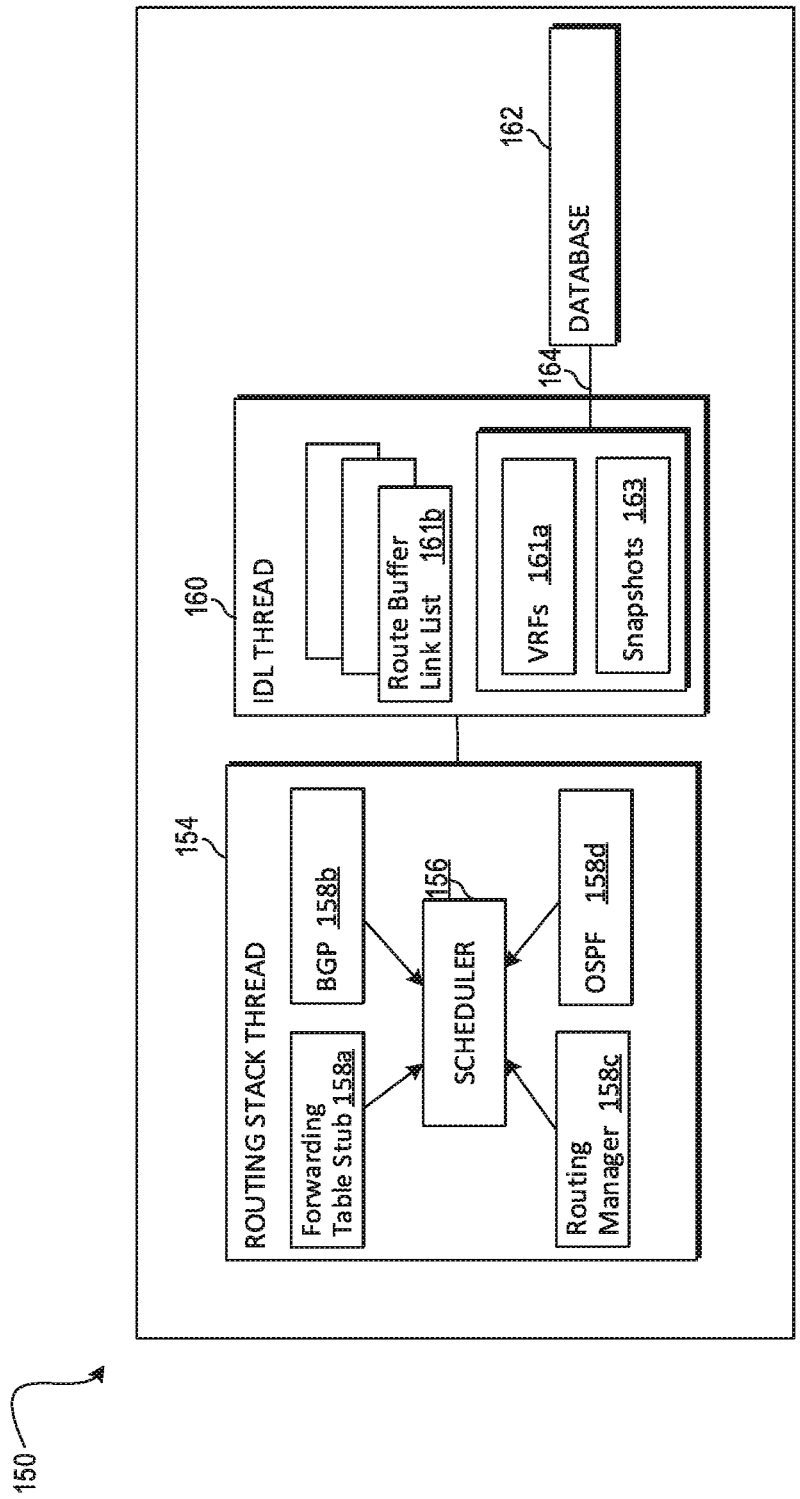
FIG. 1B is a block diagram of another example system for supporting rate adaptive transactions.

FIG. 1B is a block diagram of an example system 150 where rate adaptive transactions may be useful in routing network traffic in a network. The system 150 may include a routing stack thread 154 including a scheduler 156 that receives requests from a plurality of routing daemons 158. The routing daemons may include, for example, a forwarding table stub daemon 158a, a Border Gateway Protocol (BGP) daemon 158b, a routing manager daemon 158c and an Open Shortest Path First (OSPF) daemon 158d. Of course, these are only example daemons and other daemons may be used in conjunction with the system 150.

The scheduler may receive requests from the plurality of routing daemons 158 and communicate the requests, via communication link 159, to an interface definition language (IDL) thread 160 to commit these requests to a database 162. The database 162 may be a centralized database similar to the database 106 described above in regards to FIG. 1. Each of the routing daemons may be associated with a virtual routing and forwarding (VRF) table 161a for routing traffic through a network. Each VRF table may have an associated route buffer link list 161b for queuing actions using the VRF table. The IDL thread may communicate with the database via a networking socket 164. For example, the IDL thread 160 may transmit transaction requests to and receive responses to the transactions request from the database 162 via the communication link 164. In some embodiments, all or some of the responses form the database may be in the form of a snapshot 163 of a table level of the database 162. While the IDL thread 160 may be multithreaded, or be able to handle multiple actions at the same time, the database 162 may be single threaded, or be able to handle a single request at the same time. This may create a mismatch, where the IDL thread 160 is transmitting more requests to the database 162, than the database 162 can process at any given time. Some embodiments may have as many as 32 VRF instances or more with as many as 64K route, or more. Accordingly, the system 150 may have a range of 256K to 512K routes to manage. Accordingly, it may difficult to handle such a large number of requests at the database, especially if the database is single threaded.

Turning again to FIG. 1A, system 100 may include a processor 120 and a memory 122 that may be coupled to each other through a communication link (e.g., a bus). Processor 120 may include a single or multiple Central Processing Units (CPU) or another suitable hardware processor(s). In some examples, memory 122 stores machine readable instructions executed by processor 120 for system 100. Memory 122 may include any suitable combination of volatile and/or non-volatile memory, such as combinations of Random Access Memory (RAM), Read-Only Memory (ROM), flash memory, and/or other suitable memory.

Memory 122 stores instructions to be executed by processor 120 including instructions for request transmitter 126, baseline determiner 128, transaction request transmitter 130, transaction request determiner 132, delay time generator 134, subsequent request transmitter 136 and/or other components. According to various implementations, system 100 may be implemented in hardware and/or a combination of hardware and programming that configures hardware. Furthermore, in FIG. 1 and other Figures described herein, different numbers of components or entities than depicted may be used.

Processor 120 may execute request transmitter 126 to transmit a plurality of transaction requests from a first daemon to a centralized state based switching database. The first daemon may belong to a plurality of daemons using the centralized state based switching database to communicate with each other to perform networking related functions.

Request transmitter 126 may be used to help establish a baseline response used later on for determining whether the centralized database is exceeding its bandwidth for transaction requests. For example, the request transmitter 126 may be transmit a plurality of transaction requests to the centralized state based switching database in order to sample the response time from the centralized database under different loads. For example, the request transmitter 126 may transmit requests over a certain duration of time such that some requests are transmitted when the centralized database is not processing any other requests (i.e. zero load), a small number of requests (i.e. small load), a medium number of requests (i.e. medium load), a large number of requests (i.e. large load), etc.

Processor 120 may execute baseline determiner 128 to determine a baseline response time for receiving a response from a centralized state based switching database to the plurality of transaction requests. The baseline response time indicates that the OVSDB has available bandwidth for processing transaction requests from the plurality of daemons.

Using the information gathered by the request transmitter 126, the baseline determiner may be used to determine the baseline response time. For example, the baseline determiner may derive the average response time without congestion (based on the fastest response received) and response time with congestion (based on the slowest response received). These baselines may then be used, as described below, to determine the current load of the centralized database.

Processor 120 may execute transaction request transmitter 130 to transmit a transaction request from a first daemon to the centralized state based switching database. Processor 120 may execute transaction request determiner 132 to determine, based on a response time to the transaction request being greater than the baseline response time, that the centralized switching database is processing more requests that it can handle. Using the baselines determined by the baseline determiner 124, the transaction request determiner may be able to determine the current congestion of the centralized database. For example, if the response time from the centralized database is within the time derived as average response time without congestion, then it may be determined that there is no congestion and no action needs to be taken.

However, if the response time from the centralized database is higher than the average response time, it may be determine that there is congestion and that the centralized database is processing more transactions requests than it can currently handle. In this scenario, a delay may be added to the subsequent transaction requests sent to the centralized database. This delay may be determined, for example, based on the delay in transaction response time from centralized database. Of course this is only an example and other delay times may be used. For example, a multiple of the delay time, the delay time plus some other predetermined value, etc.

Processor 120 may execute delay time generator 134 to generate, by the first daemon, a delay time for a subsequent transaction request to the centralized switching database. The delay time allows the centralized switching state based database handle a plurality of pending transaction requests from the plurality of daemons. Processor 120 may execute subsequent transaction transmitter 136 to transmit the subsequent transaction request to centralized switching state based database after applying the delay time.

Put another way, if the response time from the centralized database is higher than the calculated average time with congestion, it may be beneficial to delay further transmissions for a pre-determined fixed time before sending the next transaction. In some aspects, the delay may also be tied to an urgency and/or importance of the message. For example, non-urgent transaction requests may be delayed for a longer period of time than This may help that transaction requests are sent without waiting for a considerable large amount of time. This again can be adaptively increased based on response times.

Figure 2:
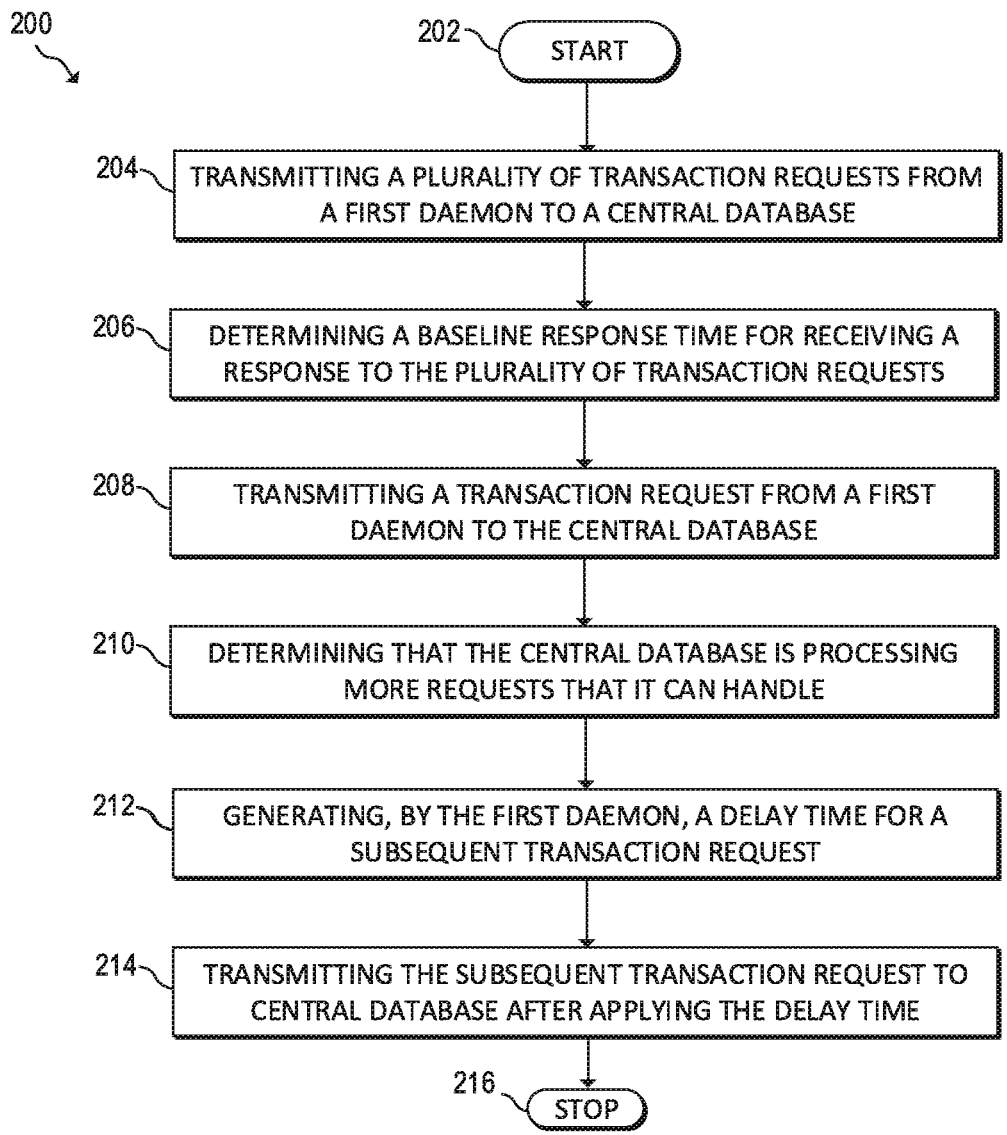
FIG. 2 is a flow diagram of an example method for reducing transaction congestion in a central database.

FIG. 2 is a flow diagram of a method 200 for a flow diagram of an example method for reducing transaction congestion in a centralized state based switching database. The method may begin at block 202 and proceed to block 204 where the method may include transmitting a plurality of transaction requests from a first daemon to a central database. The first daemon may belong to a plurality of daemons using the central database to communicate with each other to perform networking related functions. The plurality of daemons may be performing networking related functions using the central database. The plurality of daemons may be routing daemons belonging to a multi-threaded routing stack and the central database is single threaded. The plurality of transaction requests may be transmitted from the first daemon to the central database via an interface definition language (IDL) thread handling routing tables from multiple (VRF) and each daemon in the plurality of daemons may correspond to one of the routing tables from the multiple (VRF).

At block 206, the method may include determining a baseline response time for receiving a response, from the central database, to the plurality of transaction requests, wherein the baseline response time indicates that the central database has available bandwidth for processing transaction requests from the plurality of daemons.

At block 208, the method may include transmitting a transaction request from a first daemon, belonging to the plurality of daemons, to the central database. At block 210, the method may include determining, based on a response time to the transaction request being greater than the baseline response time, that the central database is processing more requests that it can handle. Determining that the response time may indicate that the central database is exceeding its available bandwidth for processing transaction requests. The response time may also indicate an unacceptable level of congestion.

At block 212, the method may include generating, by the first daemon, a delay time for a subsequent transaction request to the central database, wherein the delay time allows the central database handle a plurality of pending transaction requests from the plurality of daemons. At block 214, the method may include transmitting the subsequent transaction request to central database after applying the delay time. The method may include applying the delay time to a first subsequent transaction request with a lower priority than a second subsequent transaction request. The method may proceed to block 216, where the method may end.

Figure 3:
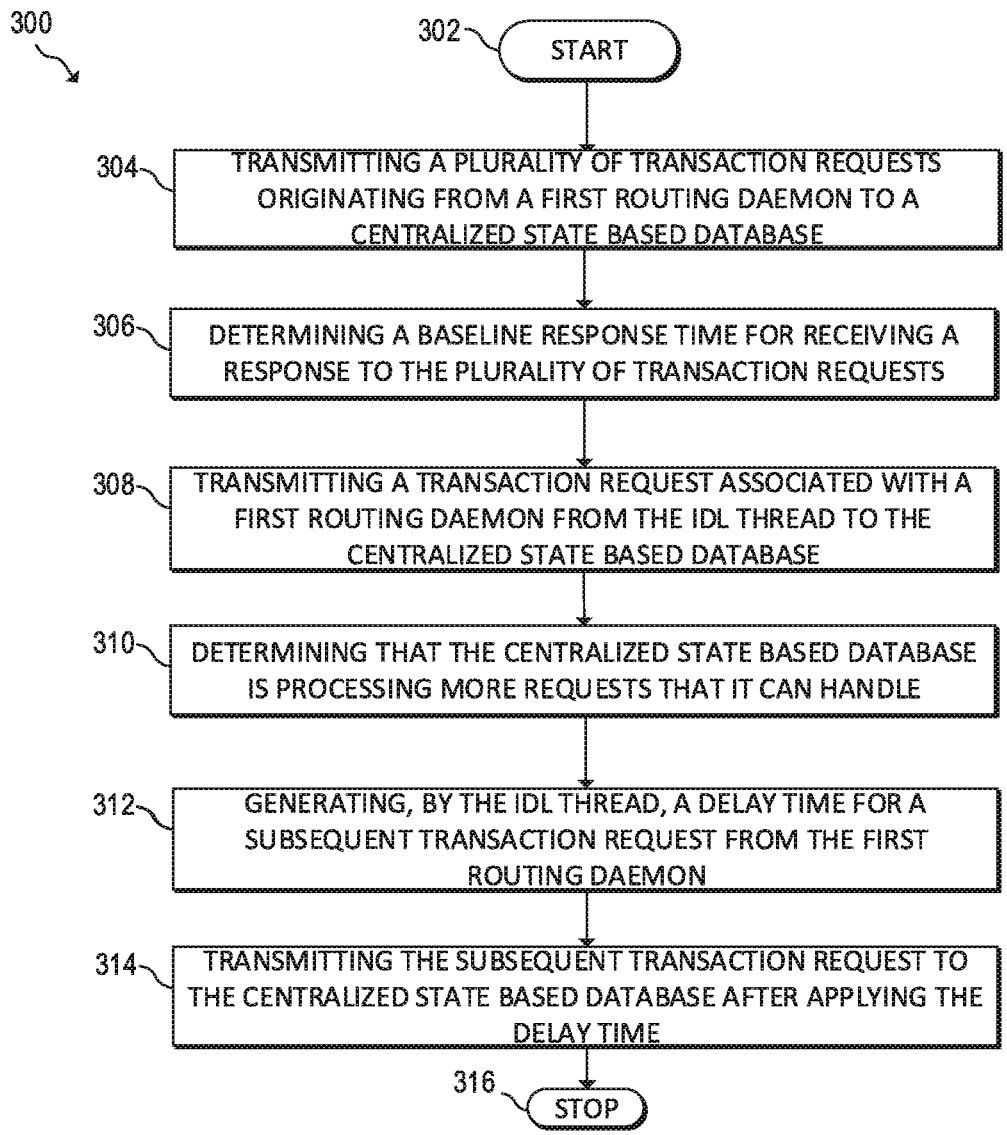
FIG. 3 is a flow diagram of an example method for congestion aware optimal route based convergence in a centralized state based switching database.

FIG. 3 is a flow diagram of an example method for congestion aware optimal route based convergence in a centralized state based switching database. The method may begin at block 302 and may proceed to block 304 where the method may include transmitting a plurality of transaction requests originating from a first routing daemon to a centralized state based database. The first routing daemon may belong to a plurality of routing daemons accessing the centralized state based database via a multithreaded IDL thread and the centralized state based database may be single threaded. The IDL thread may handle routing tables from multiple (VRF). Each routing daemon in the plurality of routing daemons may correspond to one of the routing tables. The plurality of routing daemons may be performing networking related functions using the centralized state based database.

At block 306, the method may include determining a baseline response time for receiving a response, from the centralized state based database, to the plurality of transaction requests. At block 308, the method may include transmitting a transaction request associated with a first routing daemon, belonging to the plurality of routing daemons, from the multithreaded IDL thread to the centralized state based database.

At block 310, the method may include determining, based on a response time to the transaction request being greater than the baseline response time, that the centralized state based database is processing more requests that it can handle. The response time may indicate that the centralized switching database is exceeding its available bandwidth for processing transaction requests. The response time may indicate an unacceptable level of congestion.

At block 312, the method may include generating, by the multithreaded IDL thread, a delay time for a subsequent transaction request from the first routing daemon. The delay time may allow the centralized state based database to handle a plurality of pending transaction requests from the plurality of routing daemons.

At block 314, the method may include transmitting the subsequent transaction request to the centralized state based database after applying the delay time. The delay time may be applied to a first subsequent transaction request with a lower priority than a second subsequent transaction request.

Figure 4:
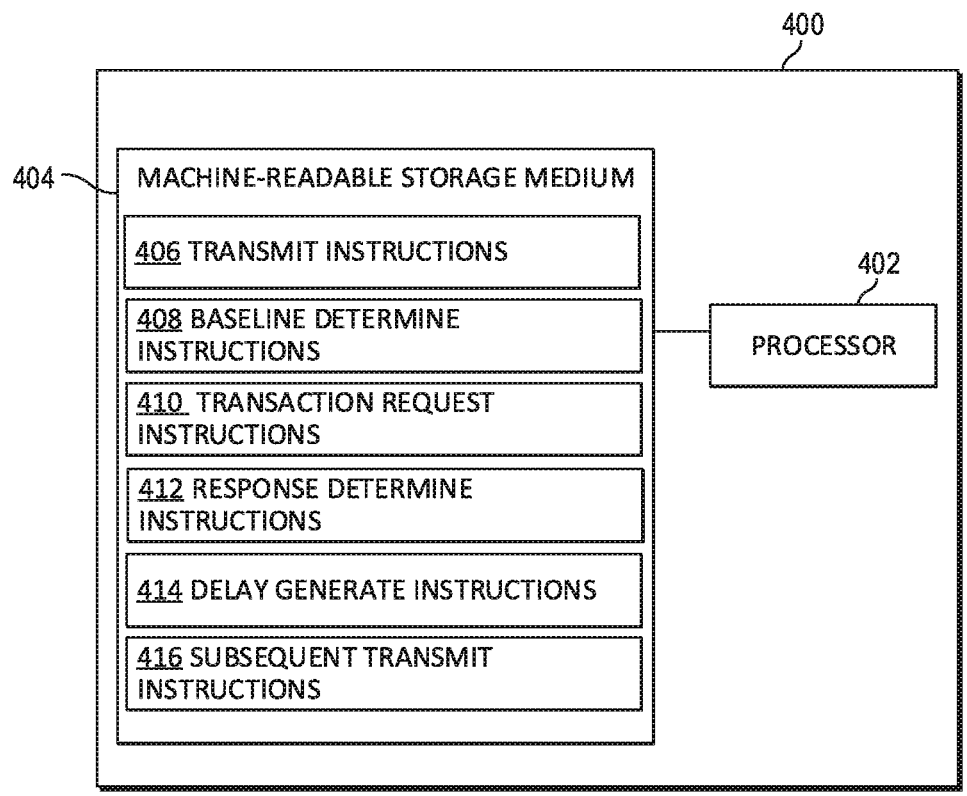
FIG. 4 is a block diagram of an example storage medium storing machine-readable instructions supporting rate adaptive transactions.

FIG. 4 is a block diagram of an example storage medium storing machine-readable instructions supporting rate adaptive transactions.

In the example illustrated in FIG. 4, system 400 includes a processor 402 and a machine-readable storage medium 404. In some aspects, processor 402 and machine-readable storage medium 404 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be at least one central processing unit (CPU), microprocessor, and/or other hardware devices suitable for retrieval and execution of instructions stored in machine-readable storage medium 404. In the example illustrated in FIG. 4, processor 402 may fetch, decode, and execute instructions 406, 408, 410, 412, 414 and 416. Processor 402 may include at least one electronic circuit comprising a number of electronic components for performing the functionality of at least one of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), a storage drive, an optical disc, and the like. Machine-readable storage medium 404 may be disposed within system 400, as shown in FIG. 4. In this situation, the executable instructions may be "installed" on the system 400. Machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for context aware data backup. The machine-readable storage medium may be non-transitory.

Referring to FIG. 4, transmit instructions 406, when executed by a processor (e.g., 402), may cause system 400 to transmit a plurality of transaction requests from a first daemon to a central database. The first daemon may belong to a plurality of daemons using the central database to communicate with each other to perform networking related functions. The plurality of transaction requests may be transmitted from the first daemon to the centralized state based switching database via an interface definition language (IDL) thread handling routing tables from multiple VRF. Each daemon in the plurality of daemons may correspond to one of the routing tables.

Baseline determine instructions 408, when executed by a processor (e.g., 402), may cause system 400 to determine a baseline response time for receiving a response, from a central database, to the plurality of transaction requests, wherein the baseline response time indicates that the central database has available bandwidth for processing transaction requests from the plurality of daemons.

Transaction request instructions 410, when executed by a processor (e.g., 402), may cause system 400 to transmit a transaction request from a second daemon belonging to the plurality of daemons, to the central database. The first daemon and the second daemon may be performing networking related functions using the centralized switch database. The first and the second daemon may belong to a multi-threaded routing stack and the centralized state based switching database is single threaded.

Response determine instructions 412, when executed by a processor (e.g., 402), may cause system 400 to determine, based on a response time to the transaction request being greater than the baseline response time, that the central database is processing more requests that it can handle. It may be determined that the response time indicates that the centralized switching database is exceeding its available bandwidth for processing transaction requests. The response time may indicate an unacceptable level of congestion.

Delay generate instructions 414, when executed by a processor (e.g., 402), may cause system 400 to generate, by the first daemon, a delay time for a subsequent transaction request to the central database, wherein the delay time allows the central database handle a plurality of pending transaction requests from the plurality of daemons.

Subsequent transmit instructions 416, when executed by a processor (e.g., 402), may cause system 400 to transmit the subsequent transaction request to central database after applying the delay time. The delay time may be applied to a first subsequent transaction request with a lower priority than a second subsequent transaction request.

The foregoing disclosure describes a number of examples for rate adaptive transactions. The disclosed examples may include systems, devices, computer-readable storage media, and methods for supporting rate adaptive transactions. For purposes of explanation, certain examples are described with reference to the components illustrated in FIGS. 1A-4. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1A-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A system comprising:
a request transmitter to transmit a plurality of transaction requests from a first daemon to a central database, wherein the first daemon performs a network operation on a networking device and belongs to a plurality of daemons of the networking device, and wherein a respective daemon uses the central database to to perform networking related functions;
a baseline determiner to determine a baseline response time for receiving a response to the plurality of transaction requests from the central database, wherein a response time up to the baseline response time indicates that the central database has available bandwidth for processing transaction requests from the plurality of daemons;
a transaction request transmitter to transmit a first transaction request from the first daemon to the central database;
a transaction requester determiner to:
determine whether a response time of a response to the first transaction request from the central database is greater than the baseline response time; and
in response to the response time being greater than the baseline response time, determine that the central database is overutilized;
a delay time generator to determine a delay time for a subsequent second transaction request from the first daemon to the central database, wherein the delay time allows the overutilized central database to process pending transaction requests prior to receiving the second transaction request; and
a subsequent request transmitter to transmit the second transaction request to the central database after waiting for the delay time.

2. The system of claim 1, wherein the plurality of transaction requests are transmitted from the first daemon to the central database via an interface definition language (IDL) thread that handles routing tables from multiple Virtual Routing and Forwarding (VRF) instances.

3. The system of claim 2, wherein a respective daemon in the plurality of daemons performs corresponding networking related functions associated with one of the VRF instances.

4. The system of claim 1, wherein the transaction requester determiner is further to determine that the response time of the response to the first transaction request indicates that the central database has exceeded available bandwidth for processing transaction requests.

5. The system of claim 1 wherein the database is a state based switching database.

6. The system of claim 1, wherein the response time indicates an unacceptable level of congestion.

7. The system of claim 1, wherein the subsequent request transmitter is further to apply the delay time to the second transaction request with a lower priority than a subsequent third transaction request.

8. A method, comprising:
transmitting a plurality of transaction requests from a first daemon to a central database, wherein the first daemon performs a network operation on a networking device and belongs to a plurality of daemons of the networking device, and wherein a respective daemon uses the central database to communicate with each other to perform networking related functions;
determining a baseline response time for receiving a response to the plurality of transaction requests from the central database, wherein a response time up to the baseline response time indicates that the central database has available bandwidth for processing transaction requests from the plurality of daemons;
transmitting a first transaction request from the first daemon to the central database;
determining whether a response time of a response to the first transaction request from the central database is greater than the baseline response time;
in response to the response time being greater than the baseline response time, determining that the central database is overutilized;
determining a delay time for a subsequent second transaction request from the first daemon to the central database, wherein the delay time allows the overutilized central database to process pending transaction requests prior to receiving the second transaction request; and
transmitting the second transaction request to the central database after waiting for the delay time.

9. The method of claim 8, wherein the plurality of transaction requests are transmitted from the first daemon to the central database via an interface definition language (IDL) thread that handles routing tables from multiple Virtual Routing and Forwarding (VRF) instances.

10. The method of claim 9, wherein a respective daemon in the plurality of daemons performs corresponding networking related functions associated with one of the VRF instances.

11. The system of claim 1, wherein the plurality of daemons include one or more routing daemons belonging to a multi-threaded routing stack, and wherein the central database is single threaded.

12. The method of claim 8, comprising:
determining that the response time of the response to the first transaction request indicates that the central database has exceeded available bandwidth for processing transaction requests.

13. The method of claim 8 wherein the database is a state based switching database.

14. The method of claim 8, wherein the plurality of daemons include one or more routing daemons belonging to a multi-threaded routing stack, and wherein the central database is single threaded.

15. A non-transitory computer-readable storage medium encoded with instructions, the instructions executable by a processor of a system to cause the system to:
transmit a plurality of transaction requests from a first daemon to a central database, wherein the first daemon performs a network operation on a networking device and belongs to a plurality of daemons of the networking device, and wherein a respective daemon uses the central database to communicate with each other to perform networking related functions;

determine a baseline response time for receiving a response to the plurality of transaction requests from the central database, wherein a response time up to the baseline response time indicates that the central database has available bandwidth for processing transaction requests from the plurality of daemons;

transmit a first transaction request from the first daemon to the central database;

determine whether a response time of a response to the first transaction request from the central database is greater than the baseline response time;

in response to the response time being greater than the baseline response time, determine that the central database is overutilized;

determine a delay time for a subsequent second transaction request from the first daemon to the central database, wherein the delay time allows the overutilized central database to process pending transaction requests prior to receiving the second transaction request; and transmit the second transaction request to the central database after waiting for the delay time.

16. The non-transitory computer-readable storage medium of claim 15, the instructions executable by a processor of a system to cause the system to:

determine that the response time of the response to the first transaction request indicates that the central database has exceeded available bandwidth for processing transaction requests.

17. The non-transitory computer-readable storage medium of claim 15, the instructions executable by a processor of a system to cause the system to:

apply the delay time to the second transaction request with a lower priority than a subsequent third transaction request.

18. The non-transitory computer-readable storage medium of claim 15, wherein the plurality of transaction requests are transmitted from the first daemon to the central database via an interface definition language (IDL) thread that handles routing tables from multiple Virtual Routing and Forwarding (VRF) instances.

19. The non-transitory computer-readable storage medium of claim 18, wherein a respective daemon in the plurality of daemons performs corresponding networking related functions associated with one of the VRF instances.

20. The non-transitory computer-readable storage medium of claim 15, wherein the plurality of daemons include one or more routing daemons belonging to a multi-threaded routing stack, and wherein the central database is single threaded.

* * * * *